(12) United States Patent
Chou et al.

(10) Patent No.: US 9,983,791 B2
(45) Date of Patent: *May 29, 2018

(54) SYSTEM MANAGEMENT CONTROLLER AND METHOD OF CONFIGURATION FILE BACKUP AND RECOVERY

(71) Applicant: International Business Machines Corporation, Armonk, NY (US)

(72) Inventors: Steven Chun Hsiang Chou, Taipei (TW); Ming-Ho Hu, Taipei (TW); Ku Chang Kuo, Taipei (TW); Bill K P Lam, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/930,153

(22) Filed: Nov. 2, 2015

(65) Prior Publication Data

US 2016/0054927 A1    Feb. 25, 2016

Related U.S. Application Data

(63) Continuation of application No. 14/699,599, filed on Apr. 29, 2015.

(30) Foreign Application Priority Data

Apr. 29, 2015  (TW) .............................. 103115435 A

(51) Int. Cl.
  *G06F 9/44*  (2018.01)
  *G06F 3/06*  (2006.01)
  *G06F 11/14*  (2006.01)
(52) U.S. Cl.
  CPC .......... *G06F 3/0604* (2013.01); *G06F 3/0632* (2013.01); *G06F 3/0683* (2013.01); *G06F 9/4411* (2013.01); *G06F 11/1415* (2013.01)

(58) Field of Classification Search
  CPC .... G06F 9/4411; G06F 3/0632; G06F 3/0683; G06F 11/1415
  See application file for complete search history.

(56) References Cited

U.S. PATENT DOCUMENTS

| 8,468,514 B2 | 6/2013 | Dang |
| 2005/0038933 A1* | 2/2005 | Himmel ................ G06F 9/4418 710/15 |

(Continued)

FOREIGN PATENT DOCUMENTS

| CN | 101657794 | 2/2010 |
| CN | 102855146 | 1/2013 |
| WO | 2013115767 | 8/2013 |

OTHER PUBLICATIONS

Non-final office action for U.S. Appl. No. 14/699,599 dated Jul. 5, 2016, 26 pp.

*Primary Examiner* — Thomas Lee
*Assistant Examiner* — Gary Collins
(74) *Attorney, Agent, or Firm* — Joseph Petrokaitis

(57) ABSTRACT

A system management controller includes a processing module and a removable storage device interface. The removable storage device interface is connectable to a removable storage device. The removable storage device pre-stores a controller configuration file. In response to connection of the removable storage device interface to the removable storage device, the processing module accesses the controller configuration file from the removable storage device and configures the system management controller according to data in the controller configuration file.

7 Claims, 3 Drawing Sheets

(56) References Cited

U.S. PATENT DOCUMENTS

| | | | |
|---|---|---|---|
| 2008/0003845 A1* | 1/2008 | Hong | H05K 1/14 439/67 |
| 2010/0017629 A1* | 1/2010 | Murakami | G06F 1/30 713/300 |
| 2011/0147447 A1* | 6/2011 | Bandholz | G06F 9/4403 235/375 |
| 2011/0154009 A1 | 6/2011 | Harmer | |
| 2011/0283214 A1* | 11/2011 | Kothandapani | G06F 9/4443 715/769 |
| 2012/0303940 A1 | 11/2012 | Grice et al. | |
| 2013/0007430 A1* | 1/2013 | Fan | G06F 9/445 713/1 |
| 2013/0138934 A1* | 5/2013 | Lin | G06F 9/4411 713/1 |
| 2013/0154798 A1* | 6/2013 | Chen | G01R 31/3025 340/6.1 |
| 2013/0179671 A1* | 7/2013 | Tsai | G06F 13/20 713/2 |
| 2013/0227226 A1* | 8/2013 | Ma | G06F 11/3034 711/154 |
| 2015/0220139 A1* | 8/2015 | Puthillathe | G06F 1/3293 713/323 |
| 2015/0347153 A1 | 12/2015 | Chou et al. | |

* cited by examiner

SYSTEM MANAGEMENT CONTROLLER AND METHOD OF CONFIGURATION FILE BACKUP AND RECOVERY

BACKGROUND

During a utilization process, such as in development and testing stages, a user may have to adjust the configurations of a system management controller and an operating system firmware interface and thus has to back up original configuration data, such that the original configurations can be recovered according to the backup data in the event of a problem.

SUMMARY OF THE INVENTION

An example system management controller includes a processing module and a removable storage device interface. The removable storage interface is connectable to a removable storage device. The removable storage device pre-stores a controller configuration file. In response to connection of the removable storage device interface to the removable storage device, the processing module accesses the controller configuration file from the removable storage device and configures the system management controller according to data in the controller configuration file.

An example computer system includes a motherboard and a system management controller disposed on the motherboard. The system management controller includes a processing module and a removable storage device interface. The removable storage interface is connectable to a removable storage device. The removable storage device pre-stores a controller configuration file. In response to connection of the removable storage device interface to the removable storage device, the processing module accesses the controller configuration file from the removable storage device and configures the system management controller according to data in the controller configuration file.

An example method of handling a configuration file includes connecting a removable storage device interface of a system management controller to a removable storage device. The method includes determining by a processing module of the system management controller whether the removable storage device has a controller configuration file. The method includes accessing the controller configuration file from the removable storage device and configuring the system management controller according to data in the controller configuration file by the processing module when the determination is affirmative.

BRIEF DESCRIPTION OF THE SEVERAL VIEWS OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

DETAILED DESCRIPTION

Figure 1:
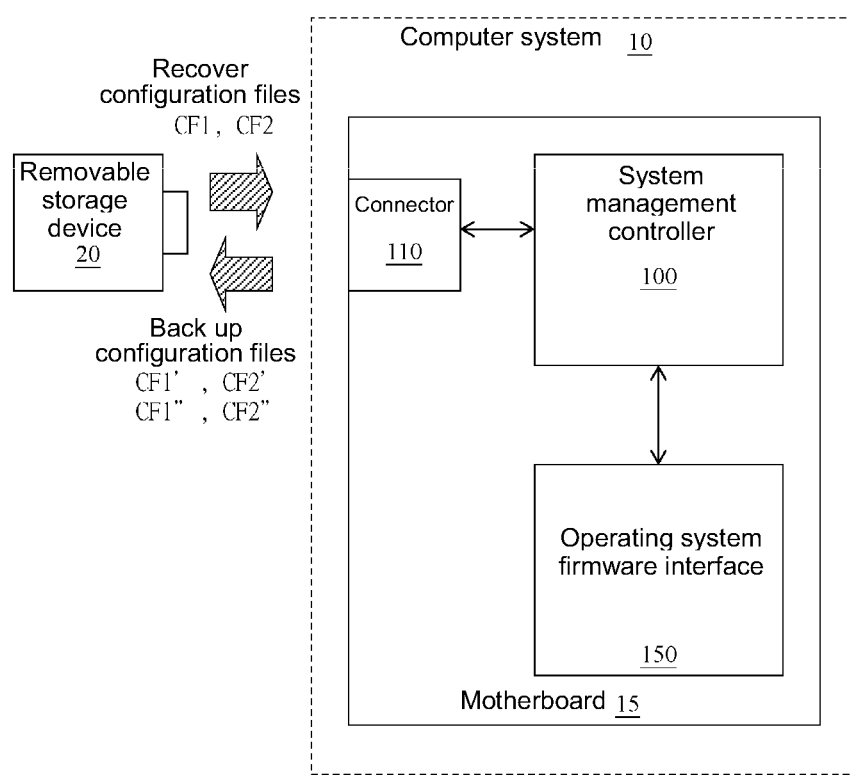
FIG. 1 is a block diagram of an example computer system.

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure. Readers of the following detailed description should, therefore, not interpret the description in a limiting sense, and only the appended claims define the scope of the embodiment of the disclosure.

Considered herein is that, during a utilization process, such as in the development and testing stages of a computer system, if the configuration of the system management controller or the operating system firmware interface on a motherboard is inappropriate and thus has to be recovered or updated, recovery or updating can be problematic. In particular, at this point in time, the development of the computer system in its entirety may not have been completed, or the computer system may not be able to boot at all. As a result, conventional techniques of recovering configuration data, for example, accessing a storage device which stores a configuration file through a host and a Southbridge chip, are of no avail.

A conventional technique of updating or recovering configuration data remotely by a network may succeed, provided that the network configuration is appropriate. However, if the network configuration is erroneous and thus has to be updated or recovered, the aforesaid technique will not succeed. Furthermore, conventionally, remote update and recovery involves additional intricate network configuration achievable by expertise not necessarily possessed by typical computer system developers and administrators; hence, in practice special support staff is required, thereby taking time and incurring costs.

In the techniques disclosed herein, system developers or administrators just have to be equipped with a removable storage device (for example, a lightweight portable inexpensive USB flash drive) and pre-store an appropriate original configuration file or the latest version of the configuration file. If the configuration of the system management controller or the operating system firmware interface on a motherboard is incorrect or needs to be updated, or even when the computer system cannot boot or has not yet booted, it will just be necessary to connect the removable storage device to the system management controller through an appropriate interface, because power can still be supplied to the system management controller. In the absence of any Southbridge chip (especially when the computer system cannot boot or has not yet booted) or any network environment support, the system management controller accesses a configuration file from the removable storage device directly to update configuration data in the system management controller or the operating system firmware interface. Likewise, the removable storage device backs up configuration data in the system management controller or the operating system firmware interface.

Therefore, according to the techniques disclosed herein, administrators use the removable storage device to back up configuration data in the system management controller or the operating system firmware interface with a host computer whose configuration is correct, connect the removable storage device to a host computer whose configuration is incorrect upon completion of the backup operation, and effectuate recovery with the configuration data previously backed up. The aforesaid process neither requires network environment support nor necessitates complicated operation.

Figure 2:
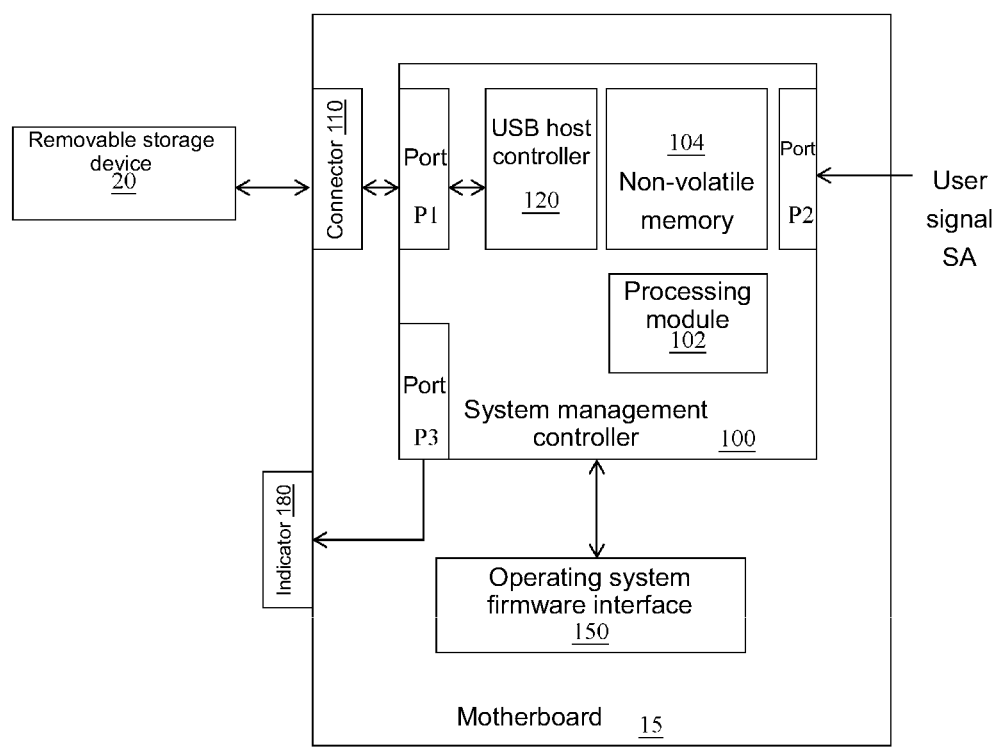
FIG. 2 is a block diagram of an example motherboard.
Figure 3:
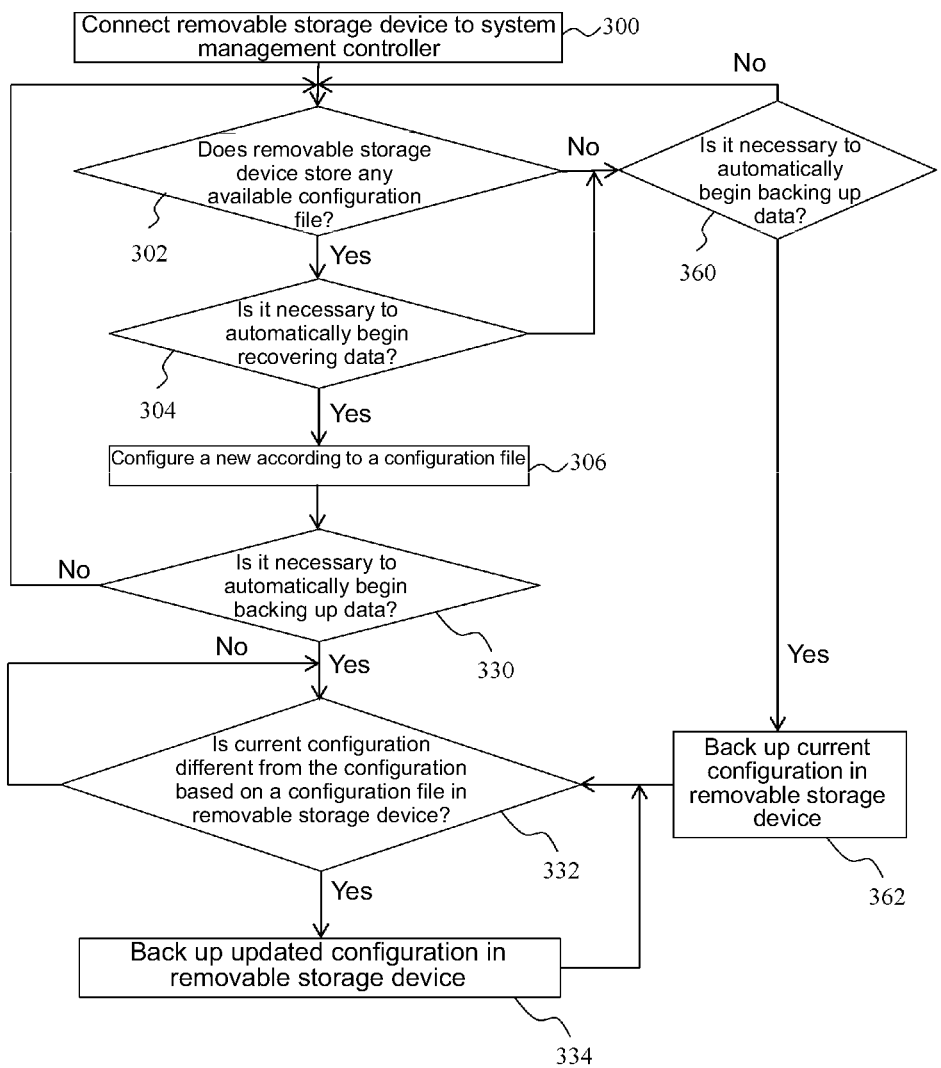
FIG. 3 is a flowchart of an example method.

Referring now to FIG. 1 through FIG. 3, computer systems, methods, and computer program products are illustrated as structural or functional block diagrams or process flowcharts according to various examples of the techniques disclosed herein. The flowchart and block diagrams in the Figures illustrate the architecture, functionality, and operation of possible implementations of systems, methods and computer program products according to various examples of the techniques disclosed herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates the hardware framework of an example computer system 10. The computer system 10 includes a motherboard 15, and, disposed on the motherboard 15, a system management controller 100, and an operating system firmware interface 150. The operating system firmware interface 150 can be implemented as for example a UEFI (Universal Extensible Firmware Interface), an EFI (Extensible Firmware Interface), or a BIOS (Basic Input/Output System). The BMC 100 is communicatively connected to the operating system firmware interface 150, and is able to write data into the operating system firmware interface 150. The system management controller 100 and the operating system firmware interface 150 each have a number of configuration parameters, for example, the IP address of the system management controller 100, and the boot mode of the computer system 10. As shown in FIG. 1, a connector 110 on the motherboard 15 is provided for connecting a removable storage device 20 to the system management controller 100. Structures of the connector 110 match the communication protocols between the removable storage device 20 to the system management controller 100.

FIG. 2 illustrates an example system management controller 100 and the operating system firmware interface 150 disposed on the motherboard 15. Note that this example can be applied to the computer system 10 which is in the development and testing stages. In other words, the example could be implemented with just the motherboard 15 shown in FIG. 2; a complete computer system as illustrated in FIG. 1 is not necessary.

The system management controller 100 includes a processing module 102 and a non-volatile memory 104. The processing module 102 executes required functions according to program code stored in the non-volatile memory 104. The non-volatile memory 104 stores data for use in the operation of the processing module 102. As one example, the system management controller 100 may be in the form of a baseboard management controller.

Referring to FIG. 2, the connector 110 on a motherboard 15 connects with the system management controller 100 through I/O port P1 of the system management controller 100. I/O port P1 may be in the form of a GPIO typical of conventional system management controllers or may be in the form of a specific port and thus is dedicated to communication with a removable storage device 20. As one example, the removable storage device 20 pre-stores configuration file CF1 to be provided to the system management controller 100 and configuration file CF2 to be provided to the operating system firmware interface 150.

As one example, the removable storage device 20 communicates with the system management controller 100 through the USB protocol. Particularly, the removable storage device 20 operates as an USB client and the BMC 100 is a USB host. For this purpose, the system management controller 100 has a USB host controller 120 connected to the I/O port P1, and the system management controller 100 operates as an USB host to detect and access the removable storage device 20 as an USB client.

The I/O port P2 of the system management controller 100 may receive a user signal SA sent from a switch or a jumper of the motherboard 150 by a user to, for example, enable/disable a USB host controller 120, or controllably drive the processing module 102 to perform recovery/backup of configuration data of the system management controller 100 or recovery/backup of configuration data of the operating system firmware interface 150.

The processing module 102 can use an indicator control signal SL sent from I/O port P3 to an indicator 180 of the motherboard 15 to indicate the current operation status (for example, ongoing recovery or backup of data) of the processing module 102 or information which may interest the other users (for example, having determined that versions of configuration file CF1 or CF2 are incompatible or out of date). The indicator 180 renders the aforesaid operation simple, and also informs the administrators of the operation status of the processing module 102 when a display screen is lacking or unnecessary.

An example method is illustrated with the process flow depicted in FIG. 3 and the components enumerated in FIG. 1 and FIG. 2. The example is not just illustrative of recovery/backup of configuration data of the system management controller 100, but is also applicable to recovery/backup of configuration data of the operating system firmware interface 150 according to the description below.

Step 300: a user connects the removable storage device 20 to the system management controller 100 through the connector 110. The USB host controller 120 of the system management controller 100 detects the removable storage device 20 and establishes data communication between the system management controller 100 and the removable storage device 20 based on a USB protocol.

Step 302: the processing module 102 determines whether the removable storage device 20 stores configuration file CF1 available to the system management controller 100. To apply the example to recovery/backup of configuration data of the operating system firmware interface 150, it is feasible to replace configuration file CF1 of the system management controller 100 with configuration file CF2 of the operating system firmware interface 150 as follows.

In step 302, the processing module 102 detects and determines whether configuration file CF1 exists according to a filename or format, and also determines whether configuration file CF1 can be used by the system management controller 100 according to identification data (such as data header) contained in configuration file CF1. For instance, the processing module 102 can further evaluate the legitimacy, integrity, and expiration date of file CF1 and assess the compatibility of the version of file CF1 and the system management controller 100. The process flow of the method proceeds to step 304, if the determination in step 302 is affirmative. The process flow of the method proceeds to step 360, if the determination in step 302 is negative.

Step 304: the processing module 102 checks the removable storage device 20 for a flag indicative of configuration data recovery. Upon detection of the flag, the processing module 102 automatically begins a process of data recovery, as described in step 306. If the flag is not detected, the process flow of the method can proceed to step 360. As another example, a switch or a jumper disposed on the removable storage device 20 or the motherboard 150 sends a signal to the processing module 102, wherein the signal substitutes for the flag indicative of automatic recovery.

Step 306: the processing module 102 stores configuration file CF1 in the non-volatile memory 104 and configures one or more parameters of the system management controller 100 anew according to contents of configuration file CF1. In case of configuration data recovery of the operating system firmware interface 150, the processing module 102 sends configuration file CF2 to the operating system firmware interface 150 to reconfigure one or more parameters of the operating system firmware interface 150 according to the contents of configuration file CF2. Step 306 is followed by the step 330.

Step 330: the processing module 102 checks the removable storage device 20 for a flag indicative of the automatically backing up of configuration data. Once the flag is detected, the processing module 102 automatically begins a data backup process as described in step 332. Likewise, a switch or a jumper disposed on the removable storage device 20 or the motherboard 150 sends a signal to the processing module 102, where the signal can substitute for the aforesaid flag indicative of the automatic backup.

Step 332: the processing module 102 further checks and determines whether current configuration of one or more parameters of the system management controller 100 has become different from the configuration based on configuration file CF1. A negative determination confirms that, after recovery (step 306), the configuration of the system management controller 100 has not further been changed or updated by, for example, system administrators. An affirmative determination confirms that, after recovery, the configuration of the system management controller 100 is updated, and thus the updated configuration has to be backed up in step 334. In case of configuration data recovery of the operating system firmware interface 150, the processing module 102 determines whether the current configuration of the operating system firmware interface 150 is the same as the configuration based on configuration file CF2 and informs the processing module 102 of this determination.

Step 334: the processing module 102 creates an updated configuration file CF1' according to the updated configuration and backs up the updated configuration file CF1' in the removable storage device 20. Recovery of configuration data (see step 306) is carried out subsequently according to the updated configuration file CF1' as needed. In case of configuration data recovery of the operating system firmware interface 150, the processing module 102 creates an updated configuration file CF2' according to the updated configuration of the operating system firmware interface 150 and backs up the updated configuration file CF2' in the removable storage device 20, and then the process flow of the method proceeds back to step 332.

Step 360: the processing module 102 checks the removable storage device 20 for a flag indicative of automatic backup of configuration data in the same manner as described in step 330. If the flag is detected, the method proceeds to step 362.

Step 362: the processing module 102 creates configuration file CF1" according to the current configuration of the system management controller 100 and backs up the configuration file CF1" in the removable storage device 20. In case of configuration data recovery of the operating system firmware interface 150, the processing module 102 creates configuration file CF2" according to the current configuration of the operating system firmware interface 150 and backs up the configuration file CF2" in the removable storage device 20. Recovery of configuration data (see step 306) is carried out subsequently according to configuration file CF1" as needed. Step 362 may be followed by step 332 and step 334, that is, if the configuration of the system management controller 100 is updated after step 362, the updated configuration can be backed up.

The foregoing embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

In the figures, systems/devices, methods, and computer program products have been illustrated as structural or functional block diagrams or process flowcharts according to various examples of the present disclosure. The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

As will be appreciated by one skilled in the art, the present invention may be embodied as a system/device, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention has been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

What is claimed is:

1. A method of handling a configuration file, comprising:
   connecting a removable storage device to a removable storage device port to of a baseboard management controller (BMC) to which a removable storage device interface of the BMC is directly connected;
   in response to a host controller of the BMC to which the removable storage device interface is directly connected, and in response to detecting user actuation of a physical switch of the BMC, determining that the removable storage device interface has been connected to the removable storage device,
   determining by a processing module of the BMC whether the removable storage device has a plurality of configuration files, including a controller configuration file and a host configuration file;
   accessing the controller configuration file from the removable storage device and configuring the BMC according to data in the controller configuration file by the processing module when the determination is affirmative, the BMC being in an unbootable state preventing remote configuration of the BMC and preventing indirect access of the controller configuration file through a different host controller of the motherboard;
   accessing the host configuration file from the removable storage device, sending the host configuration file to an operating system firmware interface of the motherboard including the BMC, and effectuating configuration according to data in the host configuration file through the operating system firmware interface by the processing module when the determination is affirmative, the operating system firmware interface being in a state preventing remote configuration thereof and preventing indirect access of the host configuration file through the different host controller of the motherboard; and after the BMC has been configured according to the data in the controller configuration file, backing up an updated configuration of the BMC to an updated configuration file in the removable storage device.

2. The method of claim 1, further comprising backing up a current configuration of the BMC in the removable storage device by the processing module when the determination is negative.

3. The method of claim 1, further comprising determining by the processing module whether the configuration of the BMC has been updated and backing up the updated configuration of the BMC in the removable storage device by the processing module when the determination is affirmative.

4. The method of claim 1, further comprising effectuating communication between the processing module and the operating system firmware interface to back up a current configuration of the operating system firmware interface in the removable storage device when the determination is negative.

5. The method of claim 1, further comprising backing up an updated configuration of the host in the removable storage device by the processing module in response to the updating of the configuration of the host.

6. The method of claim 1, wherein the processing module determines whether the removable storage device has the controller configuration file, accesses the controller configuration file, and configures the BMC in response to the host controller determining that the removable storage device has been connected to the removable storage device if a user signal has been received on a part of the BMC.

7. The method of claim 1, wherein the processing module accesses the controller configuration and configures the BMC regardless of whether the computer system is bootable.

* * * * *